US011396340B2

(12) United States Patent
Caroselli, III

(10) Patent No.: US 11,396,340 B2
(45) Date of Patent: Jul. 26, 2022

(54) TWO WHEEL ELECTRIC MOTORIZED CYCLE FRAME INCORPORATING A CASE-FREE BATTERY

(71) Applicant: Horizon Trade Group LLC, Scottsdale, AZ (US)

(72) Inventor: Romulus Edward Caroselli, III, Scottsdale, AZ (US)

(73) Assignee: Horizon Trade Group LLC, Scottsdale, AZ (US)

( * ) Notice: Subject to any disclaimer, the term of this patent is extended or adjusted under 35 U.S.C. 154(b) by 98 days.

(21) Appl. No.: 16/809,625

(22) Filed: Mar. 5, 2020

(65) Prior Publication Data

US 2021/0276653 A1     Sep. 9, 2021

(51) Int. Cl.
*B62J 43/28*     (2020.01)
*B62J 6/01*      (2020.01)
*B62K 19/30*     (2006.01)
*B62J 43/13*     (2020.01)
*B62J 43/16*     (2020.01)
(Continued)

(52) U.S. Cl.
CPC ............... *B62J 43/28* (2020.02); *B62J 6/01* (2020.02); *B62J 43/13* (2020.02); *B62J 43/16* (2020.02); *B62K 19/30* (2013.01); *B62M 6/40* (2013.01); *B62M 6/90* (2013.01); *B62K 11/02* (2013.01)

(58) Field of Classification Search
CPC . B62M 6/40; B62M 6/90; B62M 6/55; B62K 2202/00; B62K 2204/00; B62J 43/13; B62J 43/16; B62J 43/20; B62J 43/28; B62J 11/13; B62J 11/19
See application file for complete search history.

(56) References Cited

U.S. PATENT DOCUMENTS 5,477,936 A * 12/1995 Sugioka ................. B60L 53/22
                                                 180/68.5
8,727,367 B2 * 5/2014 Talavasek ............. B62K 19/30
                                                 280/281.1
(Continued)

FOREIGN PATENT DOCUMENTS

JP      2000-247278     *  9/2000   ............... B62J 9/00
WO   WO-2019065966 A1 *  4/2019   .............. B62J 11/00

*Primary Examiner* — Anne Marie M Boehler
(74) *Attorney, Agent, or Firm* — Edwin A. Sisson, Attorney at Law, LLC; Jeffrey J. Banyas

(57) ABSTRACT

The present utility model discloses a two wheel electric motorized cycle frame incorporating a case-free battery, including a frame main body with a battery containment framework disposed on the frame main body. The battery is contained by the battery containment framework. At least one side of the framework is removable to facilitate replacing the battery, and partition boards are inserted in the framework to separate out a protective cavity for electrical connections. According to the present utility model, the battery is placed in the battery containment framework, so that a battery case is omitted. The battery is safely fixed in the framework, and one side of the framework is removable to facilitate replacing the battery. Furthermore, the partition boards are disposed in the framework to separate out the protective cavity for electrical connections of battery cables, thereby solving the problem that the battery cables are exposed to the outside and cannot be effectively accommodated due to replacement of an enclosed battery case with an open framework.

7 Claims, 11 Drawing Sheets

(51) Int. Cl.
*B62M 6/40* (2010.01)
*B62M 6/90* (2010.01)
*B62K 11/02* (2006.01)

(56) References Cited

U.S. PATENT DOCUMENTS

| | | | | |
|---|---|---|---|---|
| 8,881,857 | B2* | 11/2014 | Binggeli | B62M 6/90 |
| | | | | 180/207.1 |
| 9,136,514 | B2* | 9/2015 | Kawatani | B60L 53/80 |
| 9,745,019 | B2* | 8/2017 | Evensen | H01M 50/20 |
| 2006/0000655 | A1* | 1/2006 | Schless | B62K 19/48 |
| | | | | 180/220 |
| 2009/0004554 | A1* | 1/2009 | Reed | H01M 50/20 |
| | | | | 429/97 |
| 2013/0241170 | A1* | 9/2013 | Talavasek | B62K 19/40 |
| | | | | 280/279 |
| 2014/0116190 | A1* | 5/2014 | Sugii | H01B 7/0838 |
| | | | | 74/502.5 |
| 2015/0004412 | A1* | 1/2015 | Jankura | B29C 70/345 |
| | | | | 428/377 |
| 2018/0111652 | A1* | 4/2018 | Halevi | B62H 5/001 |
| 2020/0204043 | A1* | 6/2020 | Matsushima | B62K 11/04 |
| 2020/0212759 | A1* | 7/2020 | Lin | B62J 50/30 |

* cited by examiner

TWO WHEEL ELECTRIC MOTORIZED CYCLE FRAME INCORPORATING A CASE-FREE BATTERY

BACKGROUND

Technical Field

The present utility model relates to the field of two wheel electric motorized cycle vehicles, in particular a motorized two wheel bicycle, motorcycle or scooter frame incorporating a battery, herein referred to as a two wheel Electric Cycle Vehicle (ECV2) frame because the frame can accommodate either a pedal drive typical of bicycles, or a fixed foot rest in place of pedals which is typical of a scooter or motorcycle.

Related Art

A typical ECV2 is comprised of a main frame, which may connect to a swing-arm framework to incorporate rear wheel suspension, a steerable front fork assembly with handle bar and front wheel attached, a seat for the driver, a rear wheel attached to the main frame rear stay or to the swing arm framework in the case of rear suspension, with the drive motor incorporated into the rear wheel hub, a rear utility rack which may incorporate a seat for a passenger, a kickstand for parking, a battery to power the system and an electronic controller module for functional operation and control.

The traditional ECV2 battery is housed and sometimes sealed in a customized molded plastic battery container, which may be connected externally to the frame of the ECV2 or inserted into the frame main tube. Standardization of these batteries or their containers either has not occurred or is not widespread, leaving many ECV2 owners unable to find a replacement battery and/or containers. Frequently this results in a sudden loss of resale value or even premature scrapping of the ECV2.

SUMMARY

The present utility model provides an ECV2 frame designed to accommodate readily available, off-the-shelf batteries of standard size without the need for a battery case. When such a frame is incorporated into an ECV2, its useful life is not limited by the battery or battery case as it often is when a custom battery and or custom battery case is used. Consequently, the useful life of the ECV2 is greatly extended which positions the ECV2, incorporating such a frame, better for markets demanding lower annual operating costs and longer term investment-pay back periods, including consumer and commercial purchases and rentals. Additionally, the versatility of such a frame, which may incorporate either pedals or foot rests, extends the breadth of market penetration at a lower cost.

The present utility model adopts an ECV2 frame which includes a frame main body with a battery containment framework. According to the present utility model, the battery is contained by the battery containment framework, so that a battery case is omitted. The battery is safely fixed in the framework, and at least one side of the framework is removable to facilitate replacing the battery. Furthermore, partition boards are inserted in the framework to separate out a protective electrical interconnections cavity.

The following are some embodiments of the battery case-free ECV2 frame of the present utility model.

1 The battery containment framework houses an electronic controller of the ECV2, with the electrical connections of the electronic controller being accommodated in a protective electrical interconnections cavity.

2 The battery containment framework is provided with cable ducts for brake and electrical cables running from the handle bar assembly to the rear wheel assembly. Holes in electrical ducts may be included to allow electrical wires to enter and exit the protective electrical interconnections cavity.

3 The battery containment framework includes a bottom stay assembly connected with a frame seat tube and a back stay assembly for bearing the battery. The back stay assembly and the frame seat tube incline in a same direction and are fixedly connected with the bottom stay assembly. Side rails are connected to two sides of the battery containment framework. The bottom stay assembly, the seat tube, the top brackets, the back stay assembly, and the side rails define the battery containment area. At least one of the side rails is removable.

4 The side rails may be offset from the framework sides using standoffs.

5 At least two ducts are fixedly connected with the frame main tube, the seat tube and the back stay assembly respectively and are located on two opposite outer sides of the battery containment framework; and the side rails on the two sides are respectively connected with the duct on the corresponding side.

6 The duct is connected to a middle position of the frame seat tube and the back stay assembly, and the battery containment area is divided into an upper containment vacancy and a lower containment vacancy. Partition boards are connected to upper and lower surfaces of the duct respectively, and the electrical interconnections cavity is formed between the partition boards in a sandwiching manner.

7 An upper end of the frame seat tube is fixedly connected with a frame main tube; a front end of the frame main tube is fixedly connected with a head tube for installing a handlebar and a front wheel fork assembly.

8 Top brackets are connected between the upper end of the frame seat tube and an upper end of the back stay assembly; and an upper end of the side rail is connected with the top brackets.

9 A lower end of the frame seat tube is fixedly connected with the bottom bracket for installing a pedal or foot rest assembly 10 Extending backwards out of the back stay assembly is a triangular bracing shape at a bottom of the back stay assembly with a fixedly mounted bracket for connecting a kickstand and a swing-arm assembly.

11 A bracket mounted to the top of the seat post behind the frame main tube provides a pivot connection for a single shock absorber to accommodate a swing arm assembly utilizing a single shock absorber.

12 An embodiment of the main frame with integrated rear carrier rack provides pivot connections for tandem shock absorbers to accommodate a swing arm assembly utilizing tandem shock absorbers.

13 An embodiment of the main frame with both integrated rear carrier rack and rear wheel stay framework which is also fixedly connected to the rear carrier rack rails on both sides, without suspension.

BRIEF DESCRIPTION OF THE DRAWINGS

To describe the technical solutions of the embodiments of the present utility model more clearly, the following briefly introduces the accompanying drawings required for describing the embodiments. The accompanying drawings in the following description show merely some embodiments of the present utility model, and a person of ordinary skill in the technology may still derive other drawings from these accompanying drawings without creative efforts. The following figures are exemplary schematic structure diagrams of a battery containment framework with embodiments of present utility model:

FIG. 2 shows the FIG. 1 embodiment with cables running through.

DETAILED DESCRIPTION

The following describes the embodiments of the present utility model through specific examples. A person skilled in the art can easily understand other advantages and effects of the present utility model from the content disclosed in this specification. The present utility model may also be implemented or applied through different specific embodiments. Various details in this specification may also be modified or changed based on different viewpoints and applications without departing from the spirit of the present utility model.

The present utility model is further described below in detail with reference to the accompanying drawings and specific embodiments.

Figure 1:
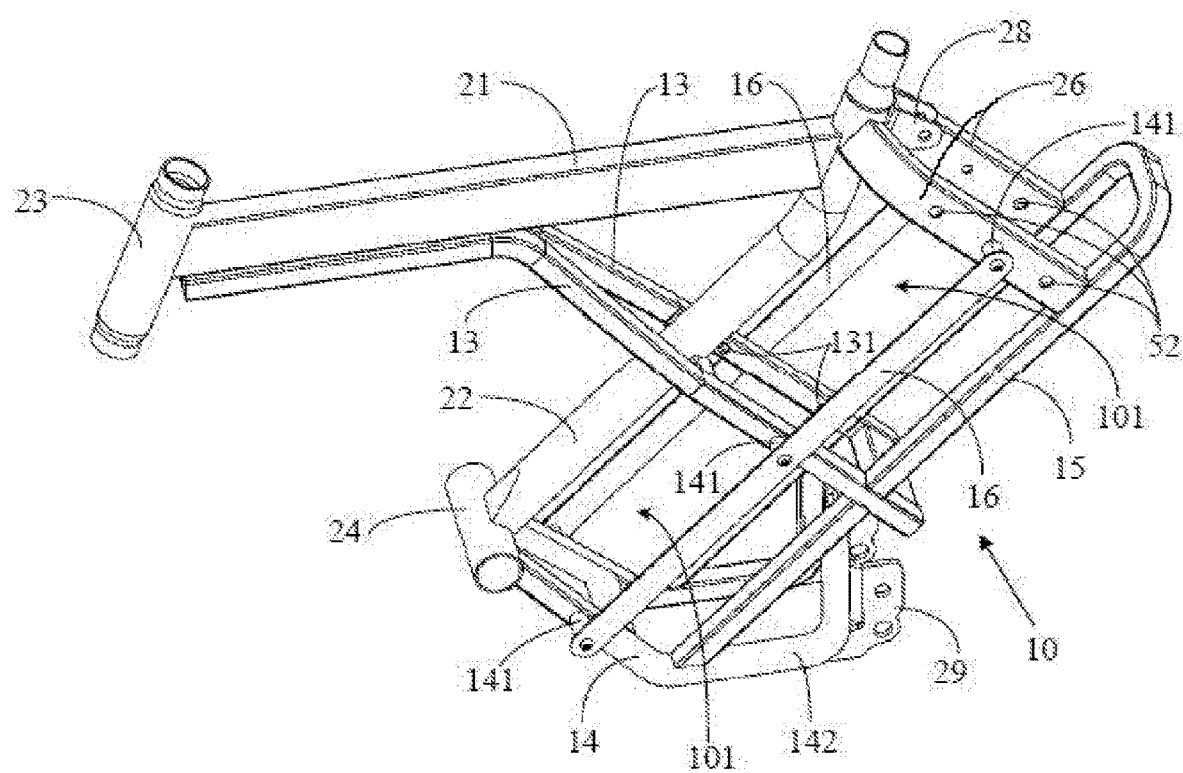
FIG. 1 is the preferred embodiment of a case-free ECV2 main frame.

Referring to FIG. 1, an exemplary schematic structure diagram of a battery containment framework in a battery case-free ECV2 frame of the present utility model is shown. As shown in the figure, the battery case-free ECV2 frame includes a frame main body and a battery containment framework 10 which is integral to the frame main body for installing a battery. The battery containment framework 10 is a rectangle-like framework body which is formed by connecting a plurality of tube fittings, and a battery containment area 101 for accommodating the battery of an ECV2 is formed in the battery containment framework 10. The battery is safely fixed in the battery containment area 101 through the tube fittings of the framework, and at the same time, at least one side of the battery containment framework 10 is set to be removable, for example, a member bar on the side is detachable to facilitate replacement of the battery.

Figure 2:
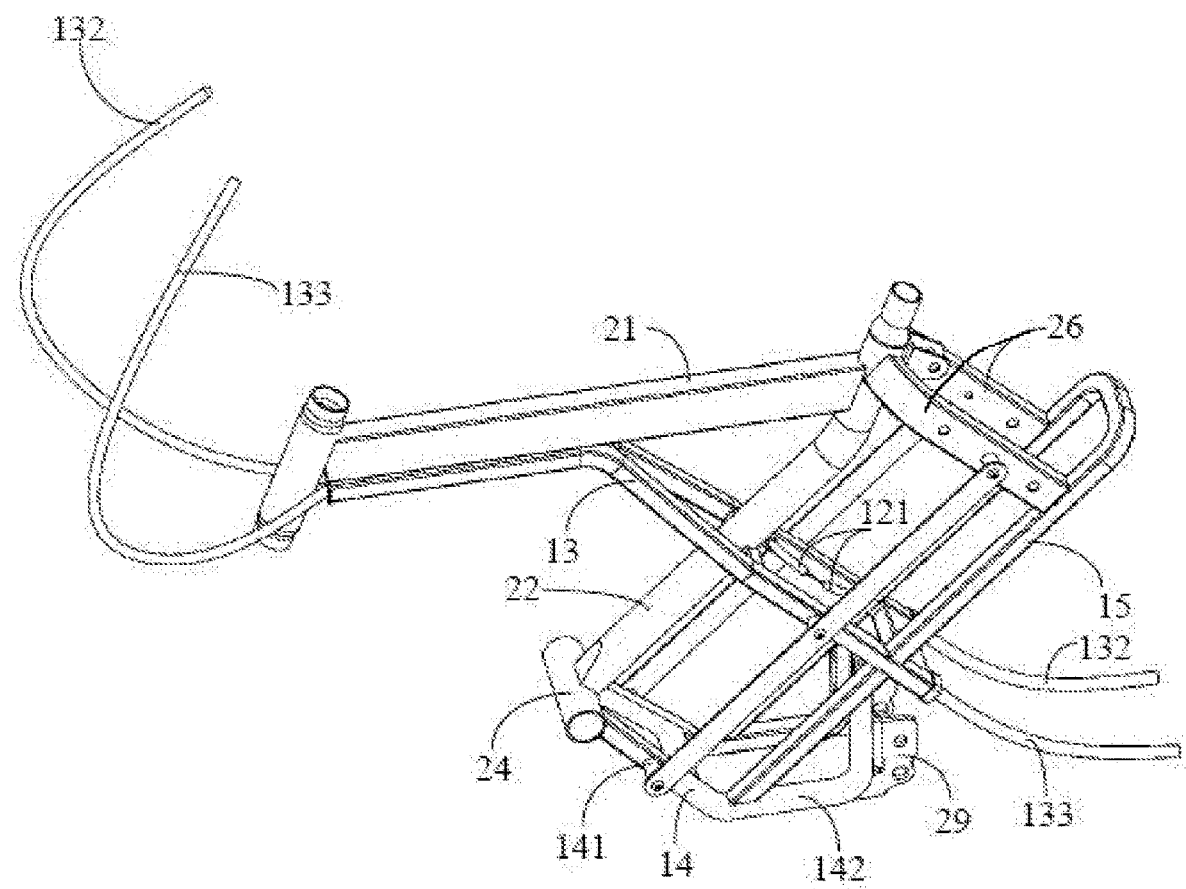
Figure 3:
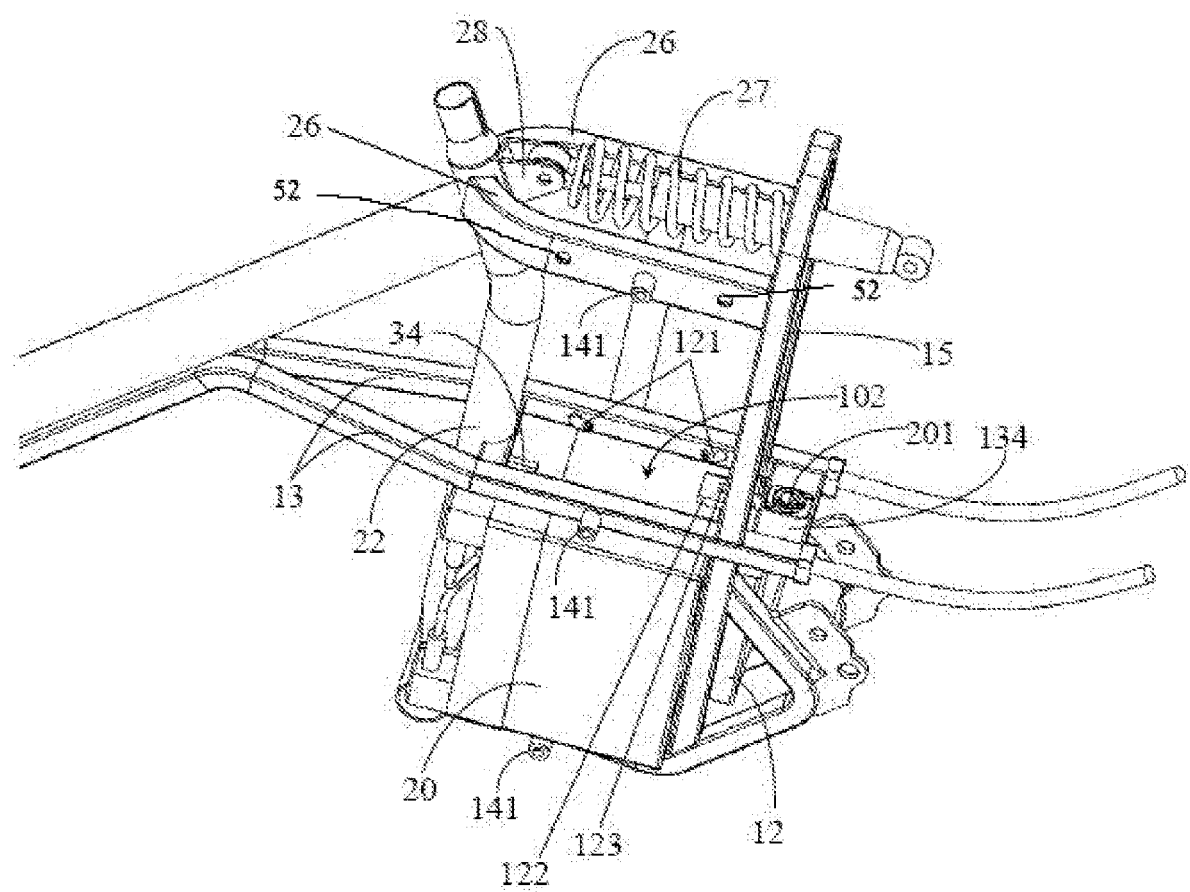
FIG. 3 is a close view of the battery containment framework in the preferred embodiment of a case-free ECV2 main frame with a lower battery & power cables, cables running through, electronic controller, charging jack and single shock absorber installed.
Figure 5:
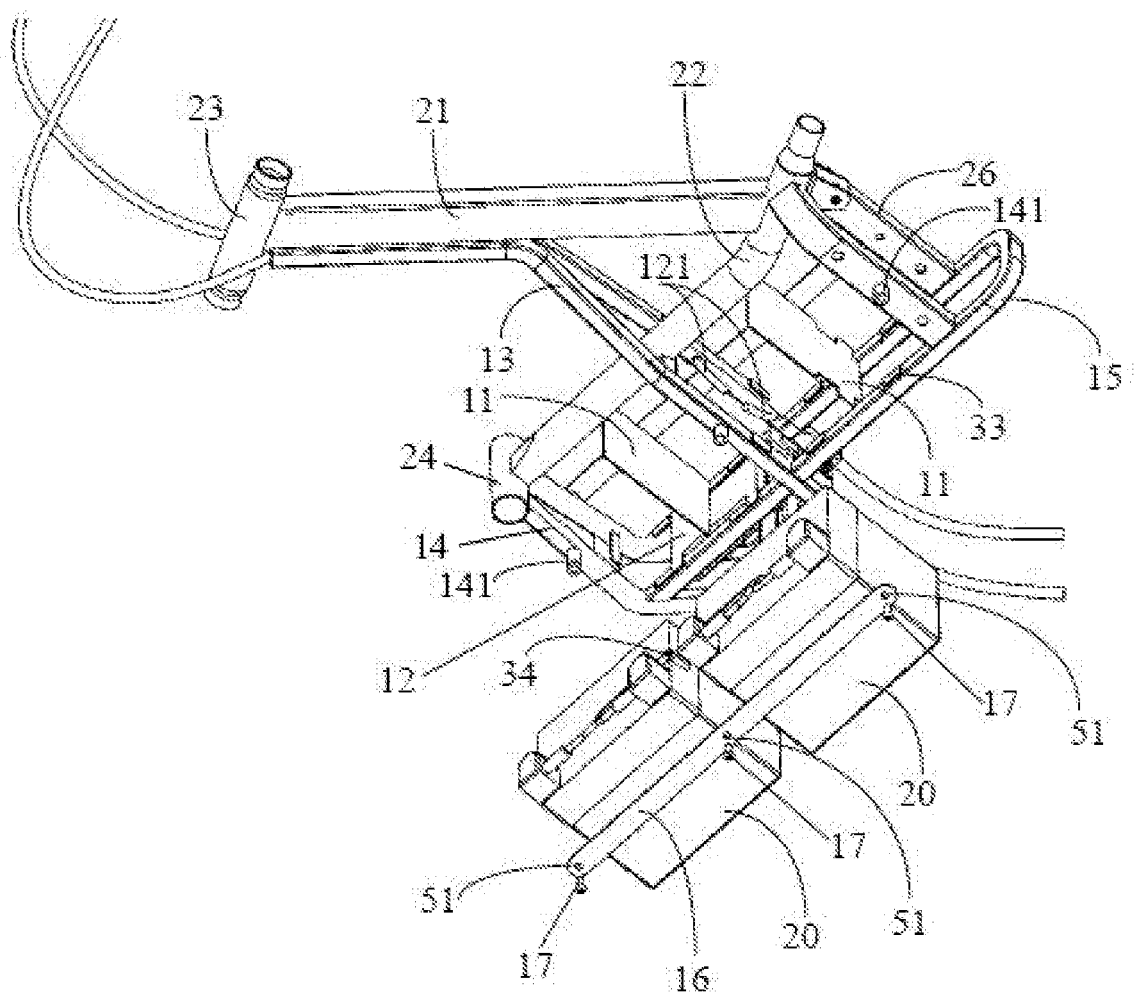
FIG. 5 is an exploded view of a battery containment framework with partition boards, batteries, and removable side rail exploded to expose the electronic controller and the space between the batteries reserved for the electrical cable interconnects.

Further, as shown in FIGS. 3 and 5, an electrical interconnections cavity 102 for accommodating electrical cables and connectors is separated out by partition boards 11 in the battery containment framework 10. The partition boards 11 are inserted in the framework to separate out the cavity providing protection from damage and the environment. Preferably, the battery cables 34 run along the seat tube 22 and wrap around the battery edge to enter the electrical interconnections cavity 102. As shown in FIGS. 1&2, electric cables 121 are led out of the cavity area via cable ports 131 in duct tube 13 to run the electrical wire cables 132 forward or rearward. Brake cable 133 runs continuously from front to rear through the other side of the tandem duct work 13

According to the ECV2 frame of the present utility model, the battery is placed in the battery containment framework rather than use a custom battery case usually made of molded plastic. Compared with the customized battery case, a framework structure is formed to enclose the battery within the framework. Readily available off-the-shelf batteries of suitable size for the given battery framework size may be installed in the battery containment framework 10, thereby eliminating the issue of premature scrapping of the ECV2 when a custom battery or battery case replacement is unavailable.

Figure 6:
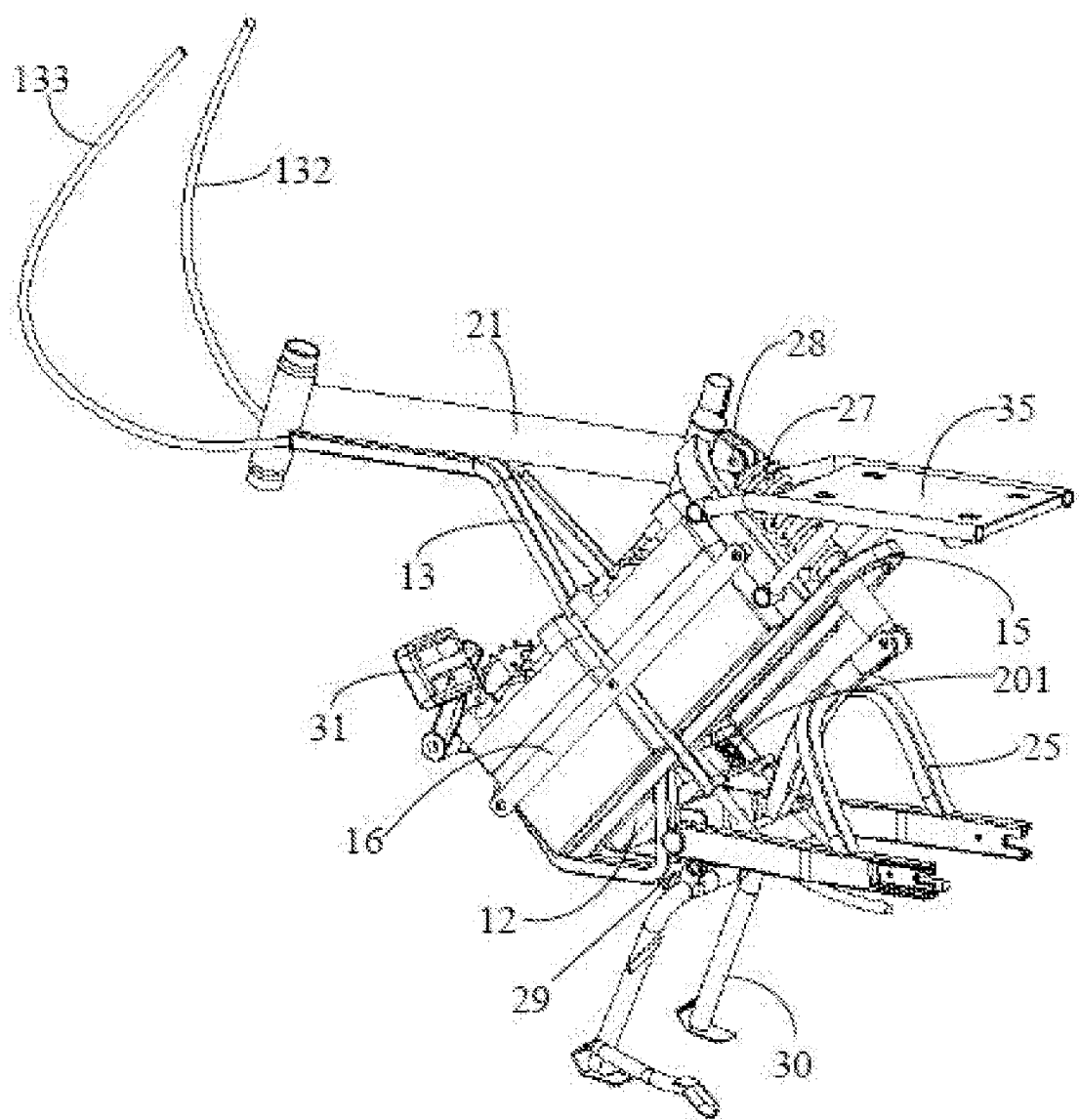
FIG. 6 is another angle of view of the FIG. 4 embodiment.

As shown in the exploded view of FIG. 5 and in FIG. 6, an electronic controller 12 of the ECV2 is strategically placed in the battery containment framework 10 directly beneath lower battery 20, with the electronic controller cables 122 a short distance to the electrical interconnections cavity 102 as shown in FIG. 3.

As shown in FIG. 1, duct 13 is provided with cable ports 131 to allow routing of electrical cables through duct 13 both forward and rearward to provide protection of the cables and concealing them for an attractive appearance.

As shown in FIG. 2, in the present embodiment, ducts 13 are placed on left and right sides of the frame symmetrically, one may be configured to allow the electrical wire cables 132 of the controller 12 to run through, while the other may be configured to allow a brake cable 133 to run through.

Figure 7A:
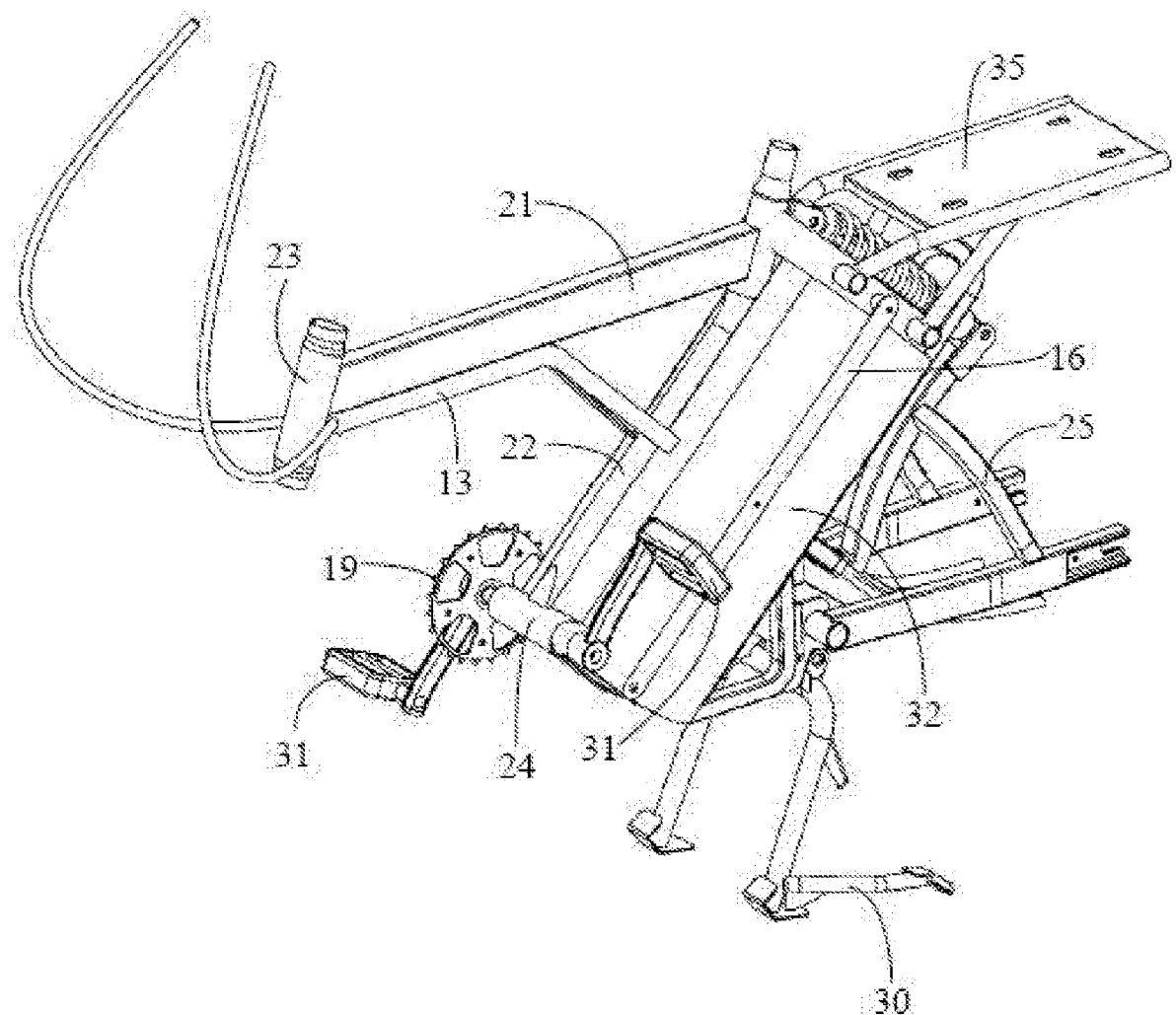
FIG. 7a is another angle view of the FIG. 6 embodiment except with batteries covered, a pedal assembly installed and a swing arm assembly with a single shock absorber installed.
Figure 7B:
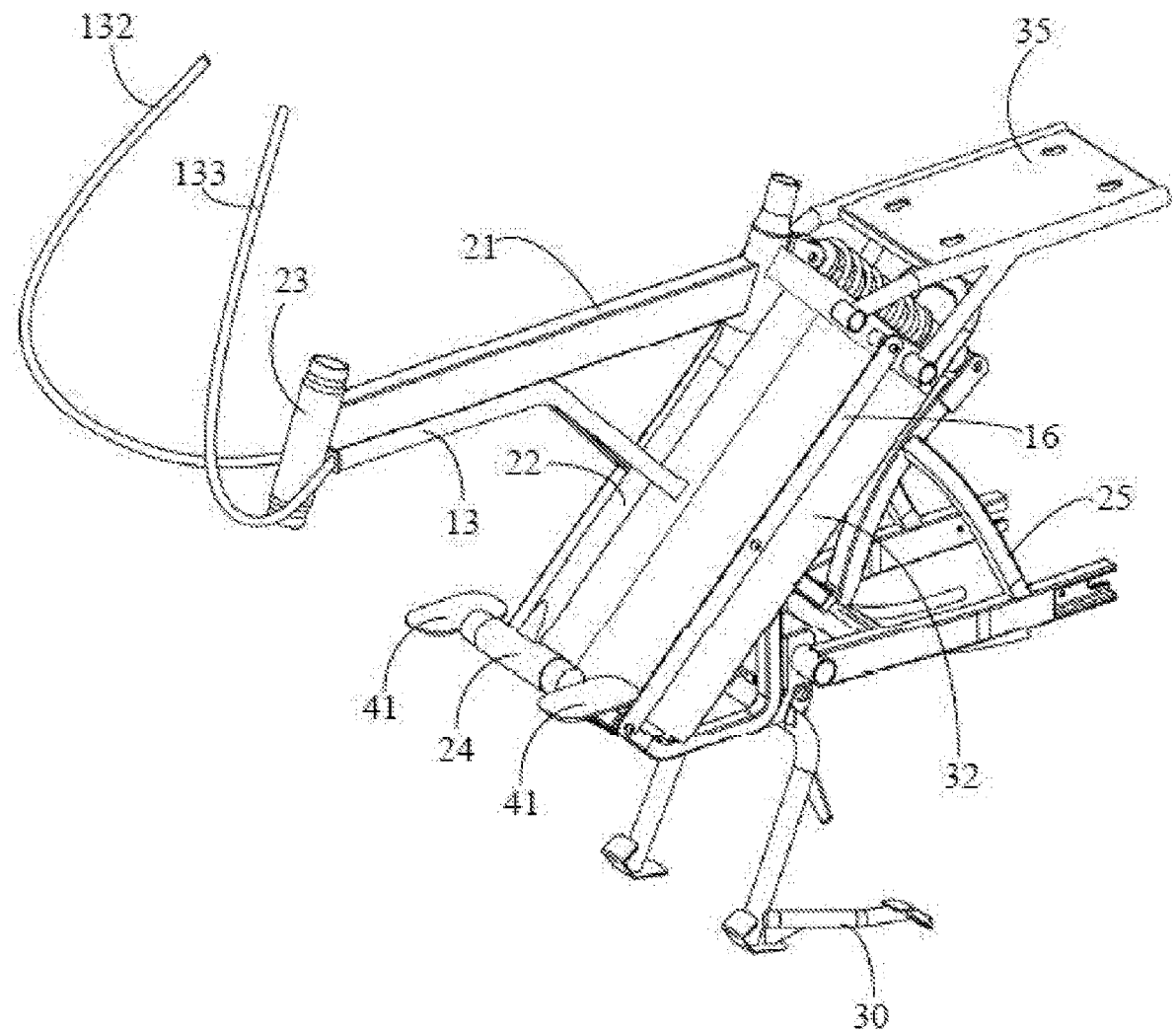
FIG. 7b is an embodiment of FIG. 7a with foot rest pads installed in place of a pedal assembly.

As shown in FIGS. 7a & 7b, the frame main body includes a frame main tube 21, a frame seat tube 22, a head tube 23 for connecting a handlebar assembly and a front wheel assembly of the ECV2, a bottom bracket tube 24 for connecting a pedal assembly 31 or a foot rest assembly 41, and a rear wheel swing arm assembly 25 for connecting a rear wheel assembly. FIG. 7a shows an embodiment of installing a pedal assembly 31 for an electric bicycle frame driven by a typical pedal. FIG. 7b is an embodiment of installing the foot rest assembly 41, replacing the pedal assembly 31 in FIG. 7a with the footrest assembly 41, which is applicable to a typical scooter or motorcycle frame.

Figure 4:
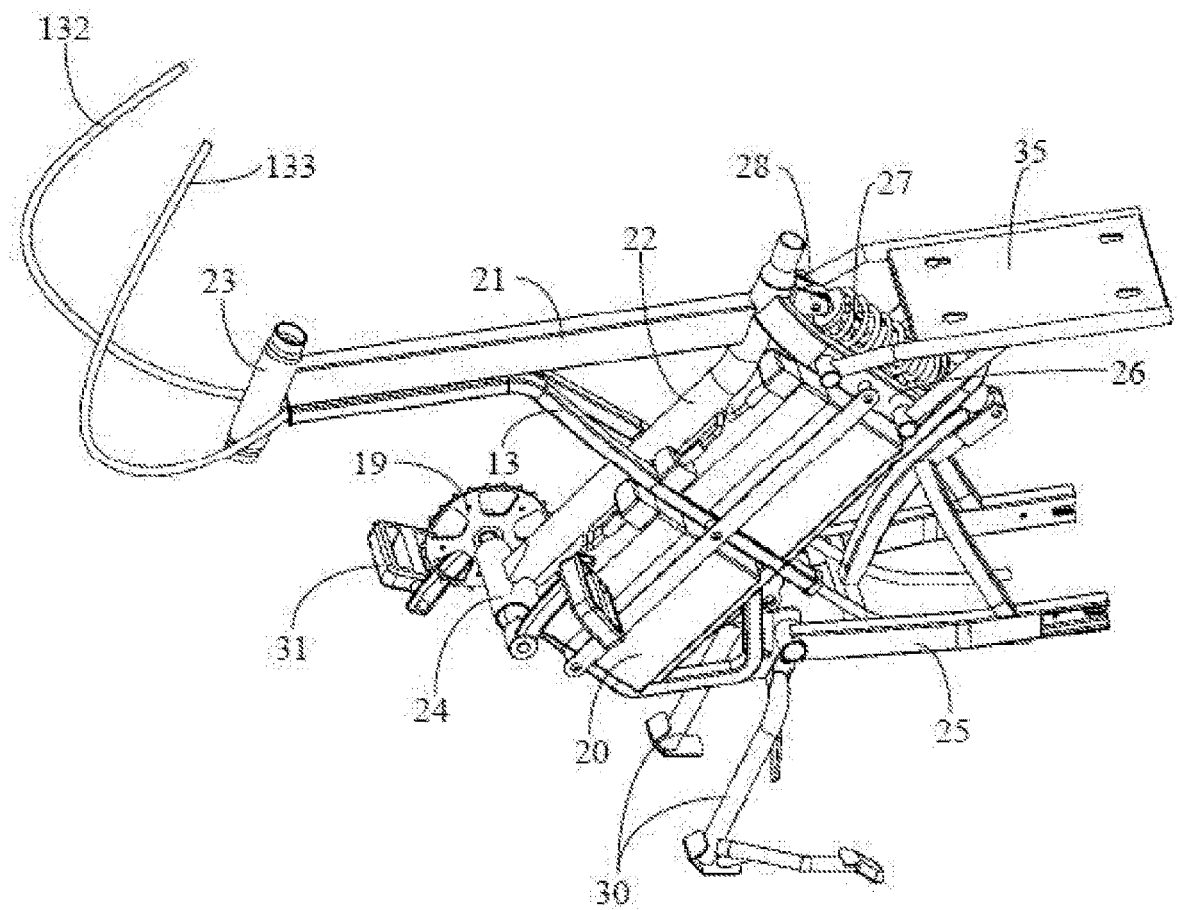
FIG. 4 is the preferred embodiment of the case-free ECV2 main frame with cables running through tandem duct tubes, upper and lower battery & power cable sets, with a rear utility rack, shock absorber, swing arm, kickstand, pedal assembly and electronic controller installed.

As shown in FIGS. 1,3&4, the frame main body includes top brackets 26 which make up the upper stay of the battery containment framework, a shock absorber support 28 for connecting a shock absorber 27. Top brackets 26 have holes 52 for attaching a trailer hitch or utility carrier rack 35. It should be understood that members constituting the frame main body may be changed with different styles of an ECV2 body. The battery containment framework of the present utility model may be installed on frames of ECV2s with various models without a limit to a specific composition of the frame main body.

As shown in FIG. 1, the battery containment framework 10 includes a bottom stay framework 14 connected with the frame seat tube 22 and a back stay assembly 15 for bearing a back of the battery. The back stay assembly 15 and the frame seat tube 22 incline in a same direction and lower ends of the back stay assembly 15 and the frame seat tube 22 are fixedly connected with the bottom stay framework 14. Side rails 16 are connected to two sides of the battery containment framework 10. The bottom stay framework 14, the seat tube 22, the back stay assembly 15, top brackets 26 and the side rails 16 on the two sides enclose to form the battery containment area 101 for installing batteries. The side rails 16 on at least one side of the battery containment framework 10 may be detached to allow for battery removal and installation.

Referring to FIGS. 3,4&5, the side rail 16 located on the side away from a chain wheel assembly of the ECV2, is set to be detachable, and is separated from the bottom stay framework 14 and sides of the battery containment framework 10 by a distance needed to accommodate the battery, using standoff posts. Particularly, in the present embodiment, standoff posts 141 are fixedly connected to the bottom stay framework 14 at the bottom, duct 13 in the middle, and top brackets 26 at the top. The detachable side rail 16 is fastened to posts 141 in a bolted connection manner, the posts 141 are provided with the internal threads matched with the bolts, bolts inserted through the mounting holes 51 in the side rail 16 are fastened into the threaded standoff posts.

Figure 8:
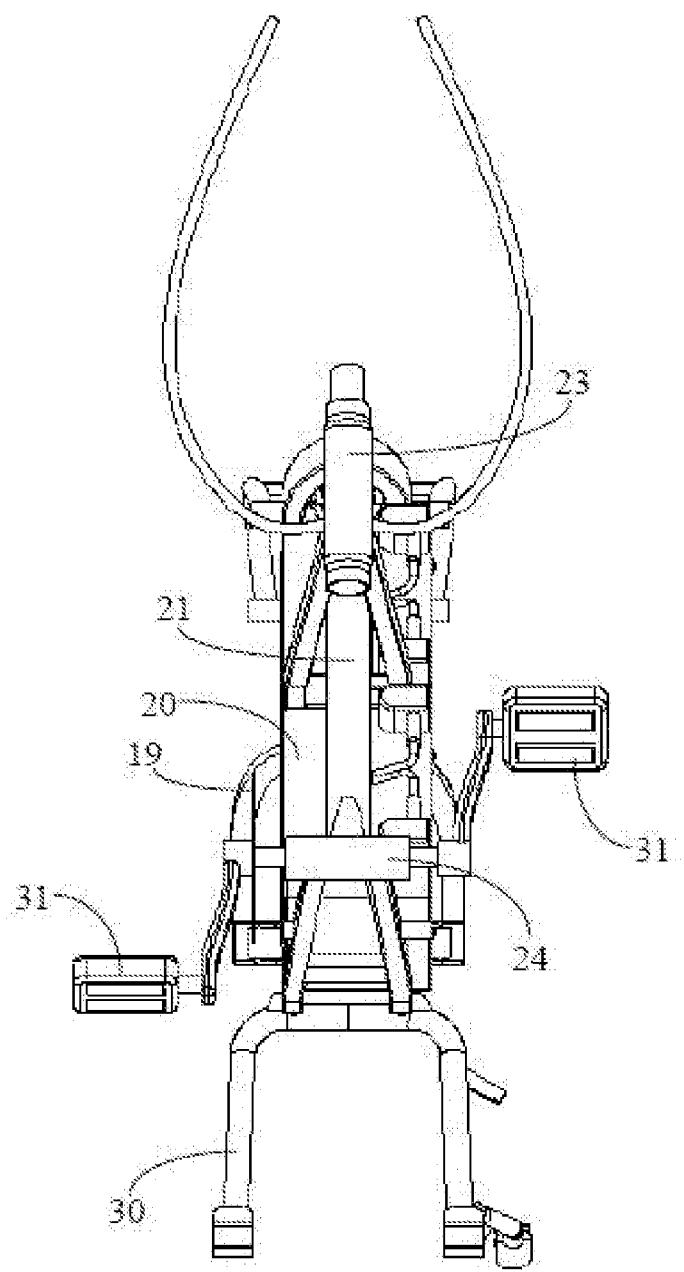
FIG. 8 is another view of FIG. 7a showing the clearance between the battery and chain wheel.

Referring to FIGS. 7a and 8, in the present embodiment, side rail 16 on a chain wheel side is directly connected to the battery containment framework side so that the offset of a battery 20 towards the non-chain wheel side provides for chain or chain sprocket 19 clearance with the battery 20.

Referring to FIG. 1, in the present embodiment, the two ducts 13 are permanently connected with the main tube 21, frame seat tube 22 and the back stay assembly 15 respectively and are located on two opposite outer sides of the battery containment framework 10.

Referring to FIGS. 1,3 & 5, the battery containment area 101 is divided into an upper containment vacancy and a lower containment vacancy. The upper containment vacancy and the lower containment vacancy may be configured to install a battery respectively, such as a BCI group U1 battery. Upper and lower surfaces of the duct 13 are connected with a partition board 11 using screws or adhesive tape. The electrical interconnections cavity 102 for accommodating battery power cables 34, electrical charging cable 123 and electronic controller cables 121,122 is formed between the two partition boards 11 in a sandwiching manner, so that the battery power cables may run around the side of battery 20 from the inside of the framework to enter the electrical interconnections cavity 102, thereby using the space between two batteries of the battery set to protect and hide electric cable interconnections.

Further, as shown in FIG. 3 and FIG. 5, the electronic controller 12 is suspended from the back stay assembly 15 of the battery containment framework, bearing directly beneath the lower battery of battery set 20. The battery may be a rechargeable battery, such as BCI group U1 size, typically of lead-acid or lithium chemistry. Rear ends of the two ducts 13 extend to the back of the back stay assembly 15, and a battery recharge socket 201 is fixedly connected to a back side of the back stay assembly 15 through a tie bracket tube 134 welded between the two duct ends. As the battery power cables are connected to the electronic controller 12, the battery is placed nearby the controller to minimize cable length between the battery and the controller, thereby reducing electrical loss, cable costs and protected from damage caused by exposure of the cables and connectors to the environment. According to the present invention, the battery and the controller are arranged reasonably in a way of minimizing the cable length, and the battery power cables are arranged by interconnecting with the electrical system in the space between the two batteries of the battery set, thereby achieving effective protection and accommodation of the cables under the condition of hiding the cables without using a custom battery case.

Further, an upper end of the frame seat tube 22 is fixedly connected with the frame main tube 21. A front end of the frame main tube 21 is fixedly connected with the head tube 23 for installing the front fork, handlebar and the front wheel assembly. A front end of the duct 13 through which cables run is attached to a lower surface of the frame main tube 21, and the duct 13 and the frame main tube 21 may be fixedly connected, so that the cables for the controller are led to the handlebar assembly through the duct 13, so as to facilitate the connection of the cables for the electronic controller and the brake cable to the handlebar assembly. Likewise, a rear end of duct 13 through which cables run is fixedly welded to tie bracket tube 134, so that the cables for the rear motor and brake are led to the rear wheel assembly. Duct 13 is used to protect, lead and conceal the cables for appearance.

A lower end of the frame seat tube 22 is fixedly connected with the bottom bracket tube 24 for installing a pedal assembly 31 or foot rest assembly 41. The bottom bracket tube 24 is in a "five-way" form; the bottom stay of the battery containment framework 10 is in an "A" shape, a front end, which is relatively narrow, is fixedly welded to the bottom bracket tube 24, and a rear end, which is relatively wide, is fixedly welded with the back stay assembly 15. The back stay assembly 15 adopts a U-shaped tube with a downward opening, and two ends on one side of the opening are fixedly welded to upper surfaces of the duct tubes 13. Further, the rear end of the bottom stay of the battery containment framework 14 extends backwards out of the back stay assembly 15 along a horizontal direction and is in a triangular bracing shape 142 at the bottom of the back stay assembly 15, thereby forming a bottom support of the battery containment framework. Specifically, the tube fittings on the two sides of the bottom stay of the battery containment framework assembly 14 extend backwards along the horizontal direction firstly and then are bent vertically and upwards, and a top is fixedly welded to the lower back stay assembly 15. A swing arm bracket 29 for connecting a rear wheel swing arm assembly 25 and kickstand 30 of the ECV2 may be further installed on a rear end of the triangular bracing shape 142.

Further, as shown in FIG. 4 and FIG. 6, in this embodiment, a shock absorber support 28 mounted to the top of the frame seat tube 22 behind the frame main tube 21 provides a pivot connection for a single shock absorber 27 to accommodate a swing arm assembly 25 utilizing a single shock absorber 27.

Figure 9:
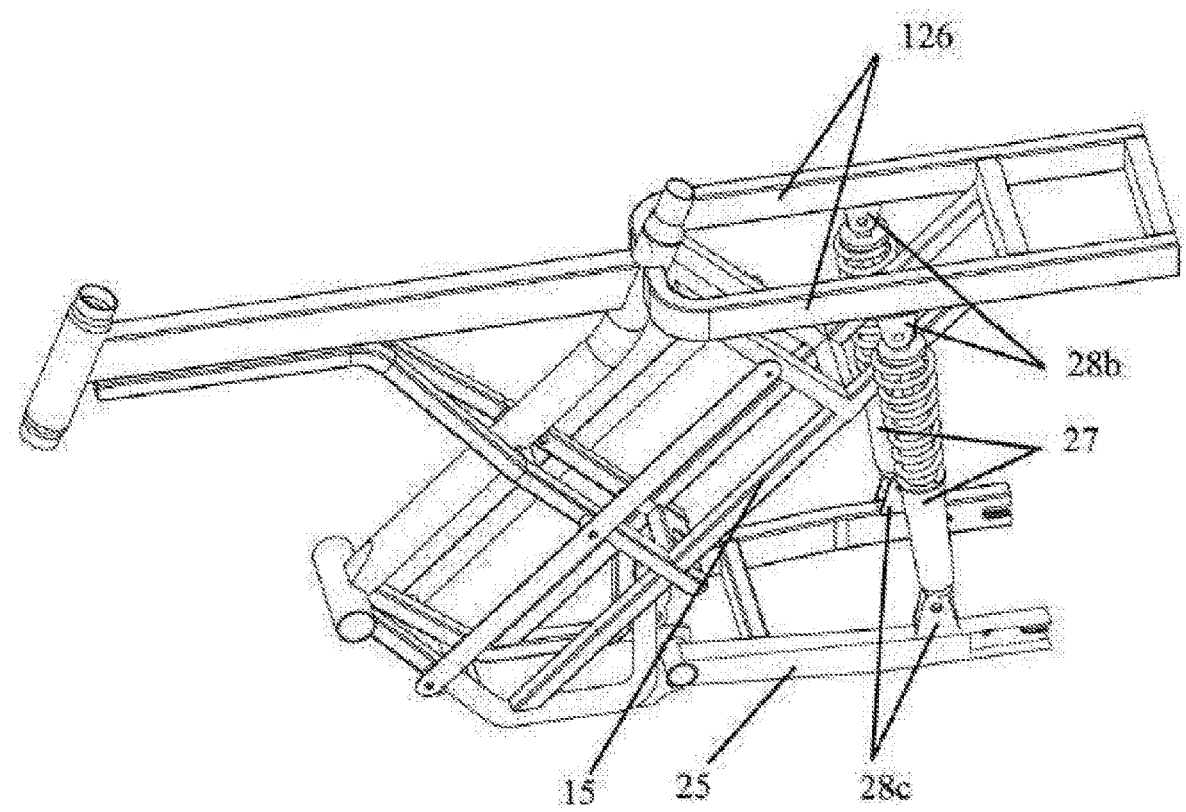
FIG. 9 is an alternate embodiment of FIG. 1 with a swing arm assembly with dual shock absorbers.

As shown in FIG. 9, in another embodiment, the rear carrier is a fixed extension of the main frame with the shock absorber support 28b,28c on each side rail of the rear carrier 126 provide pivot connections for tandem shock absorbers 27 to accommodate a swing arm assembly 25 utilizing tandem shock absorbers.

Figure 10:
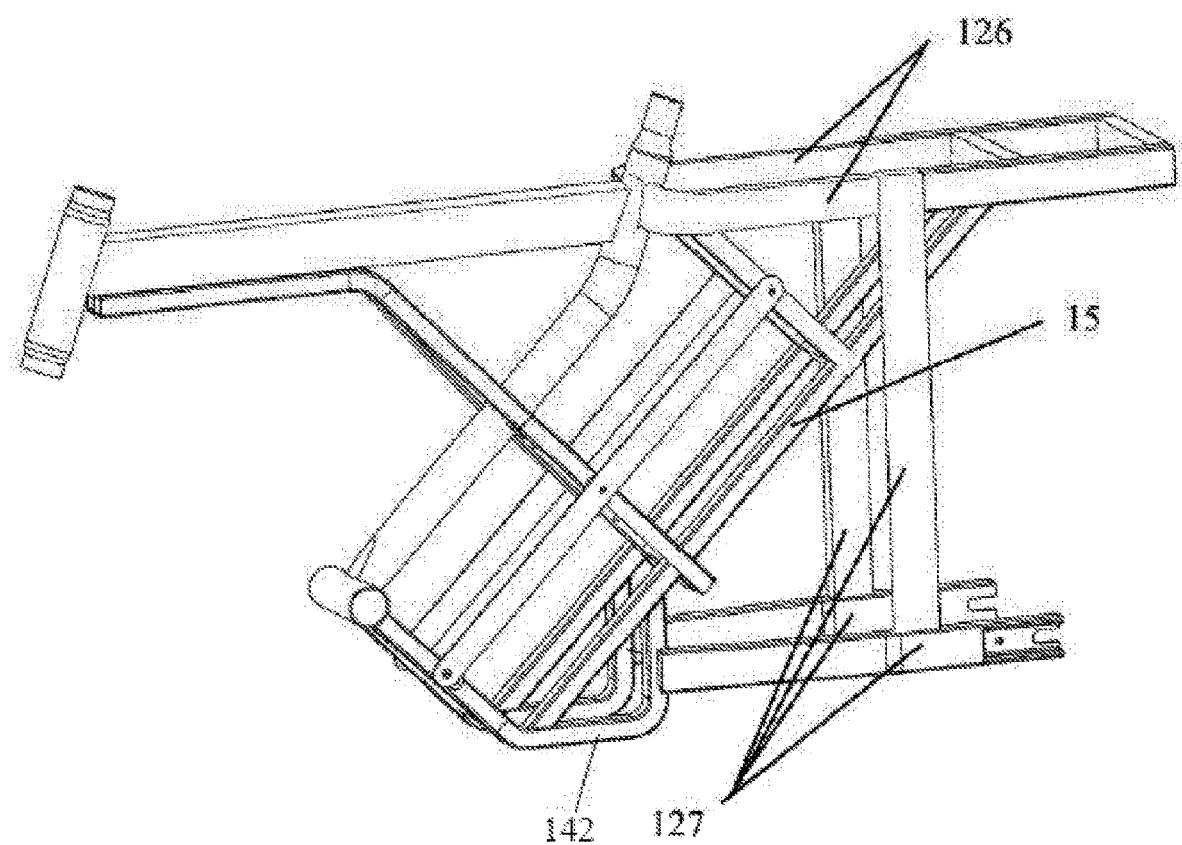
FIG. 10 is an alternate embodiment of FIG. 1 with a fixed rear wheel stay framework without suspension.

As shown in FIG. 10, in another alternative embodiment with the rear carrier as a fixed extension of the main frame, extending backwards out of the bottom of the back stay assembly is a fixedly connected rear wheel stay framework 127 which is also fixedly connected to both sides of the rear carrier 126, without suspension.

As shown in FIGS. 1 & 5, the top brackets 26 are connected between the upper end of the frame seat tube 22 and an upper end of the back stay assembly 15. Upper ends of the side rails 16 on the two sides are connected with the top brackets 26. An internal thread post may be used as the binding post, which is fixedly welded to an outer side of the top brackets. Threaded inserts may be pressed or welded into top bracket holes 52 to form a bolted connection with the rear utility rack. As the middle of the side rail may be connected an internally threaded standoff fixed with the duct 13, and a lower end of the side rail may be connected to an internally threaded standoff fixed to the bottom stay 14 of the battery containment framework 10 on a lower part of the frame, fixing on upper, middle and lower parts of the side rails 16 may be ensured, thereby ensuring that the battery is safely fixed in the battery containment framework 10. In a case of replacing the battery, the bolts 17 that pass through holes 51 in the side rails 16 are unscrewed to be removed from the frame, thereby replacing the battery conveniently.

Preferably, as shown in FIG. 7a, the ECV2 frame of the present utility model may further be provided with a shield 32, which covers the inside of the battery containment framework and the outside of the battery. The shield 32 may be made of a rigid, semi-rigid or flexible sheet-like material. Either two shields 32 are symmetrically positioned on left and right sides of the battery containment framework and are fixedly bound by side rails 16 on the corresponding side or one shield, which may be broken at the frame seat tube, and the hole is formed in the shield 32 at a position corresponding to the bolt hole in side rails 16, the bolt runs through the holes in the side rails and the shield sequentially and is screwed down at the standoff post, thereby fixing the shield in front of the side rail and cable conduit duct 13, so as to achieve the effects of covering and protecting the battery inside the battery containment framework. When the side rail on the non-chain wheel side is removed, the shield on the corresponding side may be opened without affecting the replacement of the battery.

Preferably, as shown in FIG. 5, a flexible pad 33 may further be inserted at locations where the flexible pad 33 contacts the battery and the battery containment framework, which may be made of a rubber or silica gel material, thereby achieving effects of isolation and shock absorption on the framework and the battery. The flexible pad 33 may be placed on the back stay assembly 15 and on upper and lower surfaces of the cable duct 13, and the flexible pad 33 may also be placed on the upper surface of the bottom stay of the battery containment framework.

It should be noted that, the structures, proportions, sizes, and the like depicted in the accompanying drawings of this specification merely serve to illustrate the disclosure of this specification to allow for reading and understanding by those skilled in the art, are not intended to limit the implementation of the present utility model, and therefore do not constitute any substantial technical meaning. Any modification of a structure, alteration of a proportional relationship, or adjustment of a size shall still fall within the scope of the technical content disclosed in the present utility model without affecting the effects and objectives of the present utility model. Meanwhile, terms such as "above", "below", "left", "right", "middle", "a/an", and the like in this specification are only used for the clarity of description, and are not intended to limit the implementation scope of the present utility model. Without substantially changing the technical content, an alteration or adjustment of the relative relationship of such terms shall be construed as falling within the implementation scope of the present utility model. The foregoing descriptions are merely preferred embodiments of the present utility model, and are not intended to limit the present utility model in any form. Although the present utility model has been disclosed above through the preferred embodiments, the embodiments are not intended to limit the present utility model. A person skilled in the art can make some equivalent variations, alterations or modifications to the above-disclosed technical content without departing from the scope of the technical solutions of the present utility model to obtain equivalent embodiments. Any simple alteration, equivalent change or modification made to the above embodiments according to the technical essence of the present utility model without departing from the content of the technical solutions of the present utility model shall fall within the scope of the technical solutions of the present utility model.

What is claimed is:

1. A two wheel electric motorized cycle frame incorporating a case-free battery, comprising: a frame main body with a battery containment framework integrally disposed on and inclined relative to the frame main body for receiving therein a battery as well as increasing workload of the frame main body, wherein at least one side of the battery containment framework is removable to facilitate replacing the battery, and partition boards are inserted in the battery containment framework to define a protective electrical interconnection cavity;
   wherein the battery containment framework houses an electronic controller, electrical connections of the electronic controller which are accommodated in the protective electrical interconnection cavity;
   wherein the battery containment framework is provided with cable ducts for brake cables and electrical cables running from a handle bar assembly to a rear wheel assembly, holes in the cable ducts are included to allow the electrical cables to enter and exit the protective electrical interconnection cavity;
   wherein the battery containment framework includes a bottom stay assembly connected with a frame seat tube and a back stay assembly for bearing the battery;
   wherein the back stay assembly and the frame seat tube incline in a same direction and are fixedly connected with the bottom stay assembly;
   wherein side rails are connected to two sides of the battery containment framework; and
   wherein the bottom stay assembly, the seat tube, top brackets of the frame main body, the back stay assembly, and the side rails define the battery containment area, and at least one of the side rails is removable.

2. The two wheel electric motorized cycle frame incorporating a case-free battery according to claim 1, wherein the side rails are offset from the framework sides using standoffs.

3. The two wheel electric motorized cycle frame incorporating a case-free battery according to claim 1, wherein at least two ducts are fixedly connected with the frame main tube, the seat tube and the back stay assembly respectively and are located on two opposite outer sides of the battery containment framework; and the side rails on the two sides of the battery containment framework are respectively connected with the duct on the corresponding side.

4. The two wheel electric motorized cycle frame incorporating a case-free battery according to claim 3, wherein a cable duct is connected to a middle position of the frame seat tube and the back stay assembly, and the battery containment area is divided into an upper containment vacancy and a lower containment vacancy, the partition boards are connected to upper and lower surfaces of the duct respectively, and the electrical interconnection cavity is formed between the partition boards in a sandwiching manner.

5. The two wheel electric motorized cycle frame incorporating a case-free battery according to claim 4, wherein an upper end of the frame seat tube is fixedly connected with a frame main tube; and a front end of the frame main tube is fixedly connected with a head tube for installing a handlebar and a front wheel fork assembly.

6. The two wheel electric motorized cycle frame incorporating a case-free battery according to claim 1, wherein a lower end of the frame seat tube is fixedly connected with the bottom bracket for installing a pedal or foot rest assembly, and extending backwards out of the back stay assembly is a triangular bracing shape at a bottom of the back stay assembly with a fixedly mounted bracket for connecting a kickstand and a swing-arm assembly.

7. The two wheel electric motorized cycle frame incorporating a case-free battery according to claim 1, wherein the top brackets of the frame main body are connected between the upper end of the frame seat tube and an upper end of the back stay assembly; and an upper end of each side rail is connected with the top brackets of the frame main body.

* * * * *